United States Patent
Suzuki et al.

(10) Patent No.: US 6,225,545 B1
(45) Date of Patent: May 1, 2001

(54) MUSICAL IMAGE DISPLAY APPARATUS AND METHOD STORAGE MEDIUM THEREFOR

(75) Inventors: Hideo Suzuki; Yoshimasa Isozaki, both of Hamamtsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/531,728

(22) Filed: Mar. 21, 2000

(30) Foreign Application Priority Data

Mar. 23, 1999 (JP) .................................................. 11-077546

(51) Int. Cl.[7] .................................................. G09B 15/02
(52) U.S. Cl. ........................................ 84/477 R; 84/464 R
(58) Field of Search ................. 84/600, 464 R, 84/464 A, 477 R (56) References Cited

U.S. PATENT DOCUMENTS

| | | | |
|---|---|---|---|
| 4,768,086 | * | 8/1988 | Paist . |
| 5,286,908 | * | 2/1994 | Jungleib .............................. 84/478 X |
| 5,812,688 | * | 9/1998 | Gibson . |
| 5,915,972 | * | 6/1999 | Tada .................................. 434/307 A |

* cited by examiner

*Primary Examiner*—Jeffrey Donels
(74) *Attorney, Agent, or Firm*—Morrison &Foerster

(57) ABSTRACT

A musical image display apparatus and method are provided, which are capable of synthesizing CGs from performance information for drawing in real time, and a storage medium storing a program for implementing the method. Performance information is classified into performance information related to a plurality of musical elements. Drawing patterns for each of the musical elements are stored in a data base. At least one drawing pattern is read from the data base, and the read out drawing pattern is modified according to the corresponding classified performance information to thereby generate image information corresponding to at least corresponding one of the musical elements. The generated image information is displayed on a graphic display device. Image information to be displayed by the graphic display device can be selected, as desired.

14 Claims, 11 Drawing Sheets

FIG.3C

CG FOR HARMONY EXAMPLE

FIG.3B

CG FOR MELODY EXAMPLE 2

FIG.3A

CG FOR MELODY EXAMPLE 1

FIG.3E

CG FOR RHYTHM EXAMPLE 2

FIG.3D

CG FOR RHYTHM EXAMPLE 1

MUSICAL IMAGE DISPLAY APPARATUS AND METHOD STORAGE MEDIUM THEREFOR

BACKGROUND OF THE INVENTION

1. Field of the Invention

The present invention relates to a musical image display apparatus and method which are used with an electronic musical instrument or the like, and which are capable of displaying in real time images corresponding to musical elements, that is, elements of melody, harmony, and rhythm, contained in performance information for generating musical tones, and a storage medium storing a program for implementing the method.

2. Prior Art

As display software that combines musical performance with a display of a computer graphics (CG) image or the like, there are known a computer software which varies a display screen view generated by CG in accordance with Standard MIDI File (SMF) or a MIDI (Musical Instrument Digital Interface) input, and a computer software which varies a CG screen view in accordance with the motion of a mouse cursor.

The above-mentioned types of display software are, however, capable of only performing drawing of CG images that have been prepared in advance in accordance with performance data. They are not capable of performing CG synthesis control in a manner corresponding directly or in real time to performance information obtained by the performance of a conventional musical instrument such as the performance of a keyboard. Further, they are intended for specific genres of music such as techno pop or ambient music, and cannot be utilized in all genres of music in general.

SUMMARY OF THE INVENTION

It is an object of the present invention to provide a musical image display apparatus and method that are capable of synthesizing CG images from performance information for drawing in real time, and a storage medium storing a program for implementing the method.

It is another object of the present invention to provide a musical image display apparatus and method that enable a user to enjoy a novel interaction using sound and image in a quick and easy manner.

To attain the above objects, the present invention provides a musical image display apparatus comprising an analyzer that classifies performance information into performance information related to a plurality of musical elements, and outputs the classified performance information, a drawing pattern storage device that stores drawing patterns for each of the musical elements, an image calculation device that reads out at least one drawing pattern from the drawing pattern storage device, and modifies the read out drawing pattern according to corresponding classified performance information from the analyzer to thereby generate image information corresponding to at least corresponding one of the musical elements, an image display device that displays the image information corresponding to the at least corresponding one of the musical elements generated by the image calculation device, and a selection device that selects image information to be displayed by the image display device, as desired.

Preferably, the musical image display apparatus according to the present invention further comprises a display mode selecting device that selects a mode of display of the image information selected to be displayed on the image display device.

Also preferably, the drawing patterns comprise at least one of geometrical patterns and characters, the image calculation device performing processing for modifying attributes of the read out drawing pattern that include at least one of size, shape, brightness, hue, and chroma, according to the corresponding classified performance information.

Preferably, the musical image display apparatus according to the present invention further comprises a communication interface circuit that communicates with an external machine, for enabling performance information input from the external machine via the communication interface circuit to be input to the analyzer.

Also preferably, the musical image display apparatus according to the present invention further comprises an output device that outputs the image information corresponding to the at least corresponding one of the musical elements output from the image calculation device to an external machine.

To attain the above objects, the present invention also provides a musical image display method comprising an analyzing step of classifying performance information into performance information related to a plurality of musical elements, and outputting the classified performance information, a drawing pattern storage step of storing drawing patterns for each of the musical elements, an image calculation step of reading out at least one drawing pattern stored by the drawing pattern storage step, and modifying the read out drawing pattern according to corresponding classified performance information output the analyzing step to thereby generate image information corresponding to at least corresponding one of the musical elements, an image display step of displaying the image information corresponding to the at least corresponding one of the musical elements generated by the image calculation step, and a selection step of selecting image information to be displayed by the image display step, as desired.

To attain the above objects, the present invention further provides a machine readable storage medium containing instructions for causing the machine to perform the above musical image display method.

The above and other objects, features, and advantages of the invention will become more apparent from the following detailed description taken in conjunction with the accompanying drawings.

BRIEF DESCRIPTION OF THE DRAWINGS

FIGS. 3A to 3E are views showing examples of visual expression of musical elements of melody, harmony, and rhythm by the musical image display apparatus, in which:

FIG. 3A is a view showing an example of melody expression;

FIG. 3C is a view showing an example of CG for harmony;

FIG. 3D is a view showing an example of CG for rhythm; and

FIGS. 6A to 6C are flow charts showing operations of the melody expression processor, the rhythm expression processor, the harmony expression processor, and the synthesis display processor, in which:

DETAILED DESCRIPTION OF PREFERRED EMBODIMENTS

The present invention will now be described in detail with reference to the drawings showing embodiments thereof.

Figure 1:
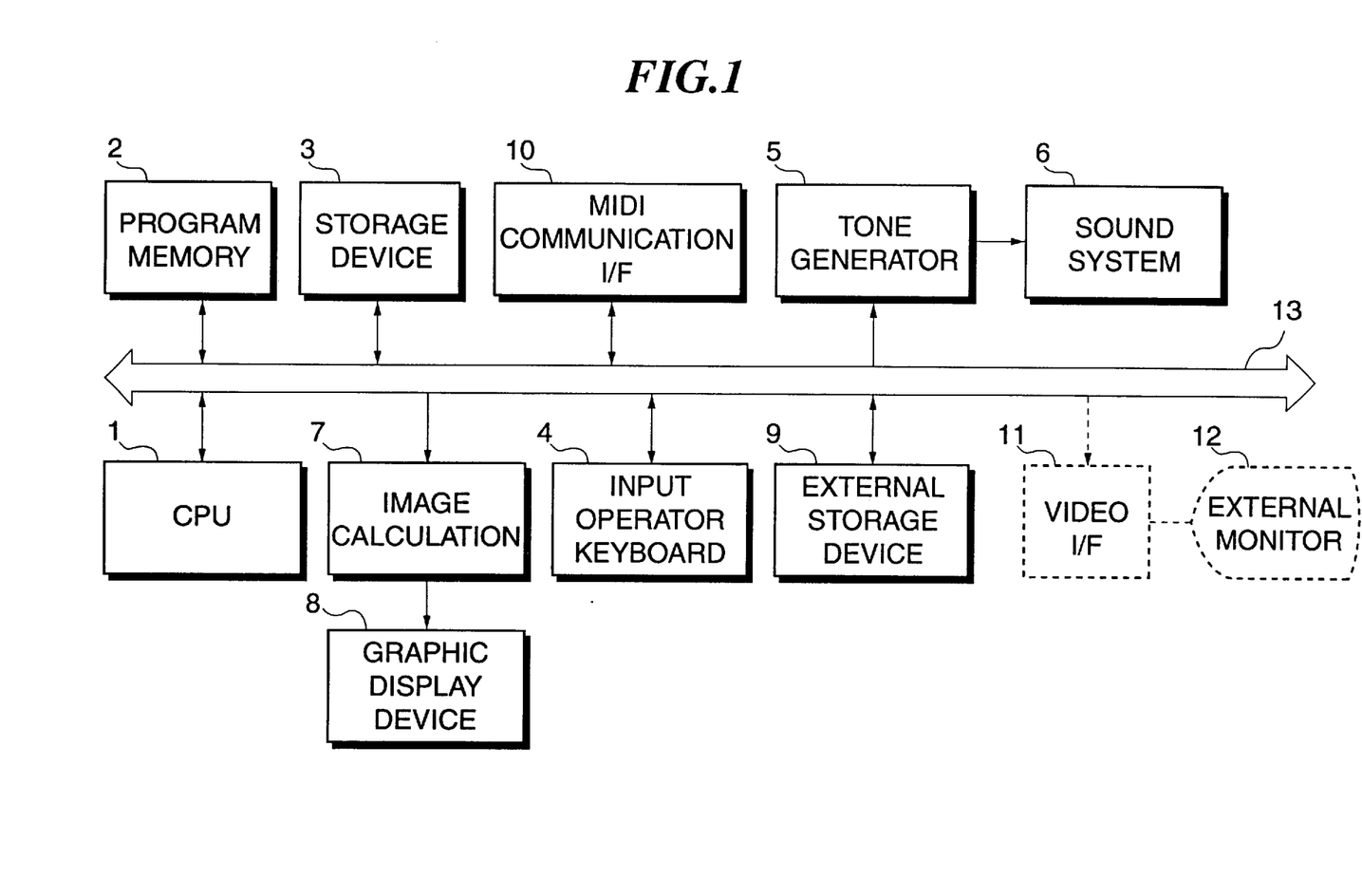
FIG. 1 is a block diagram showing the construction of a musical image display apparatus according to an embodiment of the present invention.

FIG. 1 is a block diagram showing the construction of a musical image display apparatus according to an embodiment of the present invention. The present embodiment is applied to an electronic musical instrument having a musical image display function, which is comprised of an electronic musical instrument having a keyboard, and the musical image display apparatus according to the present invention incorporated in the electronic musical instrument. The present invention may be, however, equally applied to a sequencer, a drum machine, or a general purpose personal computer, as described later.

In FIG. 1, reference numeral 1 denotes a central processing unit (CPU) that controls the overall operation of this electronic musical instrument with a musical image display function, 2 a program memory that stores a control program, and 3 a storage device comprised of a read only memory (ROM) and a random access memory (RAM), which stores a style database containing various automatic performance patterns such as rhythm patterns and auto bass chord patterns, a melody drawing pattern database, a harmony drawing pattern database, and a rhythm drawing pattern database that contain respectively a plurality of drawing patterns corresponding to respective musical elements (melody, harmony, and rhythm) of pieces of music, and various other data. The storage device 3 is also used as working area. Reference numeral 4 denotes a keyboard and an operating switch group consisting of various operating elements provided on an operating panel. Reference numeral 5 denotes a tone generator that generates musical tone signals of scale tones and rhythm tones for a plurality of channels. The tone generator 5 may be of any type such as a waveform memory type, an FM type, a physical model type, a harmonics synthesizing type, a formant synthesizing type, and an analog synthesizer type of VCO+VCF+VCA. The tone generator 5 is not limited to a tone generating circuit formed of dedicated hardware, but may be a tone generating circuit composed of a digital signal processor (DSP) and a microprogram, or may be composed of a CPU and a software program. The tone generator 5 includes an effector that applies various effects such as vibrato or reverberation to musical tones to be generated. Reference numeral 6 denotes a sound system that amplifies and emits musical tones output from the tone generator 5.

Reference numeral 7 denotes an image calculation device that calculates and outputs image data for displaying drawing patterns corresponding to musical elements of pieces of music. Reference numeral 8 denotes a graphic display device that displays the operative state of this electronic musical instrument with a musical image display function and the operative state of the operating switches as well as image information (drawing pattern) corresponding to each musical element of a musical piece.

Reference numeral 9 denotes an external storage device such as a hard disk, a floppy disk, a compact disk-read only memory (CD-ROM), a magneto-optical disk (MO), and a digital video disk (DVD), 10 a MIDI-interface circuit for communication with an external MIDI machine, 11 a video interface circuit for displaying a drawing pattern corresponding to each musical element of a musical piece on an externally connected monitor 12, and 13 a bus line for data transmission between the components described above.

Figure 2:
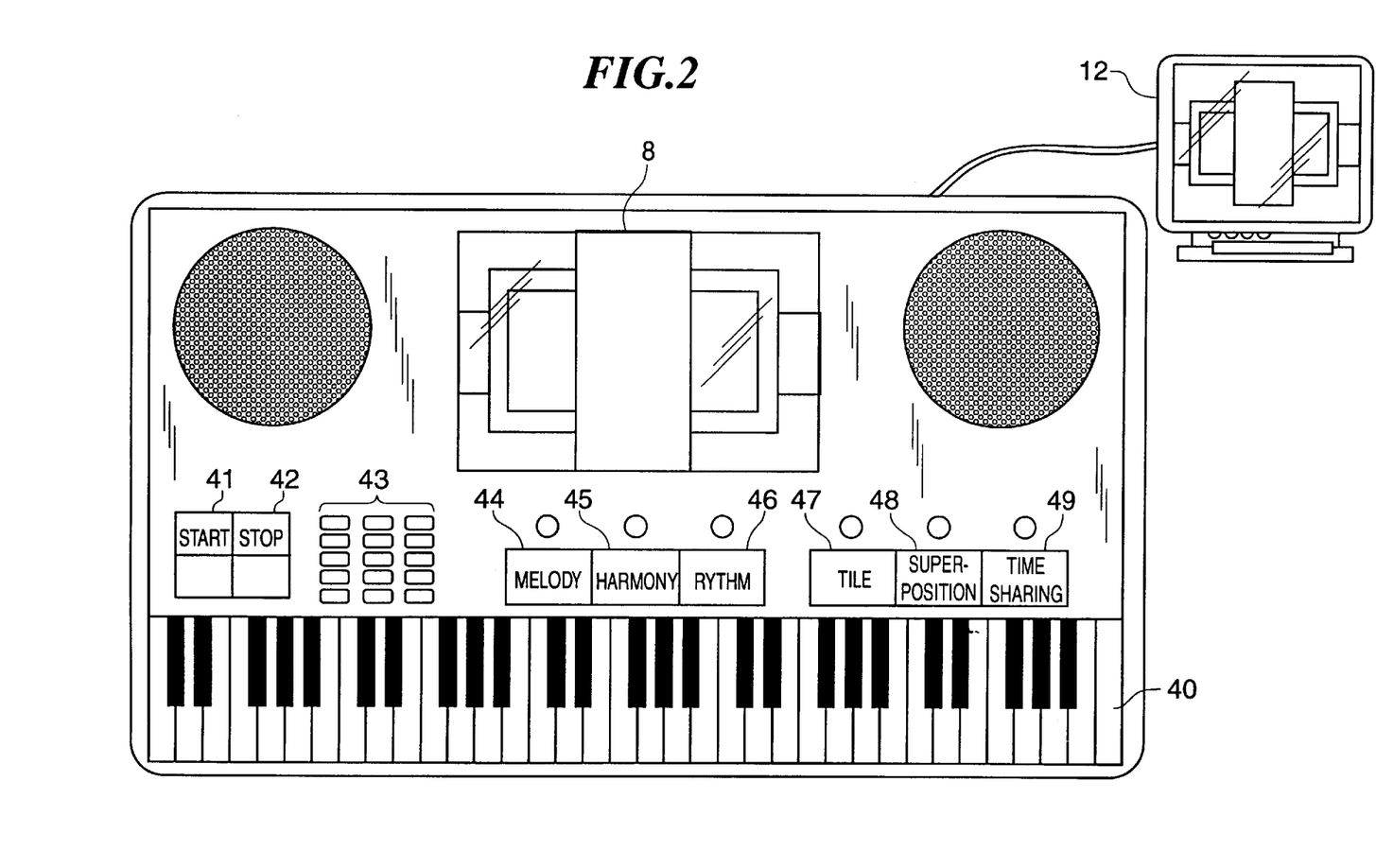
FIG. 2 is a view showing the appearance of an example of an electronic musical instrument having a musical image display function as an application of the present invention.

FIG. 2 shows an example of the appearance of the electronic musical instrument with a musical image display function. In this example, the above-mentioned operating switch group 4 is comprised of a keyboard 40, a start switch 41 that instructs the start of automatic performance, a stop switch 42 that instructs the stop of automatic performance, a style selection switch 43 for the selection of automatic performance pattern, the selection of tone color, and the selection of drawing patterns to be displayed corresponding to the elements of melody, harmony and rhythm, a melody display switch 44, a harmony display switch 45, and a rhythm display switch 46 for selecting respectively whether drawing patterns corresponding to the respective musical elements should be displayed or not, and a tile display switch 47, a superposition display switch 48, and a time sharing display switch 49 for setting respective display modes when drawing patterns corresponding to a plurality of musical elements are to be displayed.

The style selection switch 43 is provided dedicated templates for respective musical elements of melody, harmony, and rhythm. The selection of the drawing pattern by the style section switch 43 can be accomplished such that drawing patterns can be arbitrarily selected from the templates by operating the selection switch 43.

All of the melody display switch 44, harmony display switch 45, and rhythm display switch 46 are toggle switches, and are each able to select whether to display its corresponding drawing pattern or not. As shown in FIG. 2, an indicator lamp is provided above each of the switches 44 to 46 to indicate the on/off state of the switch.

When two or more of the melody display switch 44, harmony display switch 45, and rhythm display switch 46 are on, drawing patterns of musical elements corresponding to the two or more switches that are on are displayed in the display mode that is set by the tile display switch 47, superposition display switch 48, or time sharing display switch 49. For example, when the tile display switch 47 is on, the screen of the graphic display device 8 or the external monitor 12 is divided into a plurality of regions, and drawing patterns of musical elements which are selected by the switches 44 to 46 to be displayed are simultaneously displayed on the divided screen regions. The number of divisions may be dynamically changed according to the number of musical elements having drawing events.

When the superposition display switch 48 is on, drawing patterns of musical elements which are selected to be displayed are simultaneously displayed in superposition on the display screen. The order of this superposition is usually set to be melody, rhythm, and harmony from above. However, this order may be changed. The transmissivity of each of drawing patterns of the musical elements displayed in the superposition may be arbitrarily set.

When the time sharing display switch 49 is on, the drawing patterns of musical elements which are selected to be displayed are periodically switched and displayed. If in a period during which a drawing pattern of a musical element is to be displayed, there is no event and hence no drawing pattern for the musical element, a drawing pattern of the next element may be displayed.

An indicator lamp is also provided above each of the switches 47 to 49 for selecting the display mode, so as to allow the selected switch to be readily recognized.

FIGS. 3A to 3E show examples of drawing patterns for the musical elements of melody, harmony, and rhythm.

Figure 3A:
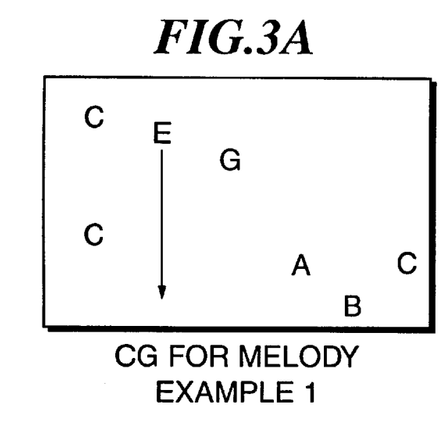

FIG. 3A shows an example of melody expression. In this example, an alphabet character that indicates a pitch name corresponding to each key depression is displayed. Upon key depression, an alphabet character indicating a pitch name corresponding to the depressed key is displayed on an upper part of the screen, and then moves downward or falls on the screen with lapse of time, as indicated by an arrow in the figure. Immediately before the alphabet character reaches the bottom of the screen, the falling speed is braked. The falling speed is proportional to the velocity of key depression. When the pitch is raised upon a pitch-bend or the like, the alphabet character moves to the right on the screen, and when the pitch is lowered, the alphabet character moves to the left. Usually the alphabet character falls straight, but when a sustain pedal is stepped on, it falls flattering like a falling leaf.

The font of the displayed alphabet character is set depending on the tone color. The displayed position in the transverse direction on the screen corresponds approximately to the position of key depression, that is, the pitch of the depressed key. In addition, the color or the brightness of the displayed alphabet character is varied depending on the pitch name or the key region.

Figure 3B:
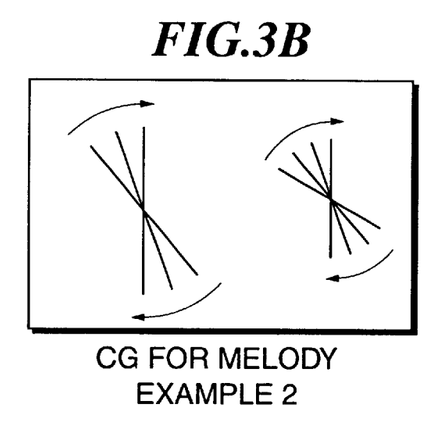
FIG. 3B is a view showing another example of melody expression.

FIG. 3B shows another example of melody expression. In this example, a melody is expressed by a straight bar which is displayed upon key depression and which is rotated with after-image effect. The transverse position in which each bar is displayed corresponds approximately to the position of key depression. The display color of the bar corresponds to the note number. Each bar is rotated at a rotational speed corresponding to the velocity, and gradation is given to the display color. The length of the bar is varied according to the category of tone color (stringed instrument, brass instrument, and so forth). This category can be distinguished from a program change number according to a tone generator standard such as GM.

Figure 3C:
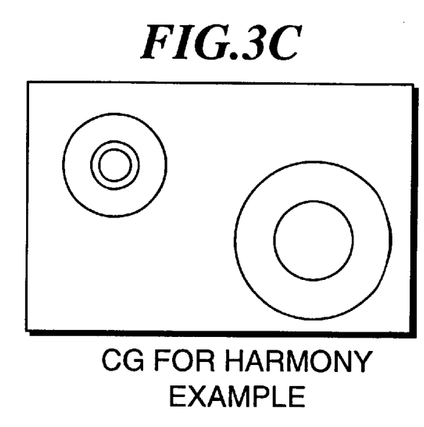

FIG. 3C shows an example of CG for harmony. In this example, a harmony is expressed by an expanding disk of display color corresponding to the chord type. As the disk expands, the color of the disk changes in brightness or becomes blurred while the color tone is kept constant. The transverse position in which the disk is displayed corresponds to the position of key depression from which a chord has been detected. The vertical position corresponds to a mean value of the velocity of the chord-detected key depression. In addition, the expanding speed of the disk and the manner of brightness change correspond to the duration of the generated harmony. The shape of the display color is not limited to disk. A polygon such as a rectangle may be used. The shape may be changed according to the tone color of the harmony. In this connection, in FIG. 2, referred to above, an example using a plurality of rectangles of different colors is shown.

Figure 3D:
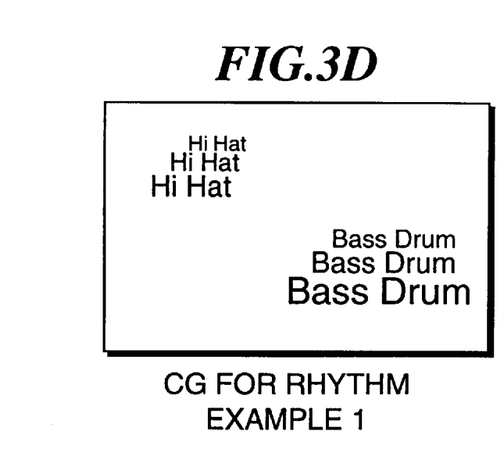

FIG. 3D shows an example of CG for rhythm. In this example, a character indicating the name of a musical instrument is displayed for each musical instrument. The position in which the name of each instrument is displayed corresponds to the instrument, and the size and number of the character displayed are determined according to the velocity and intensity of the key depression. In addition, the font of the character is varied according to the rhythm style such as reggae or jazz. The display color of the character may be varied depending on the instrument, and the color tone may also be changed according to the rhythm style. For example, the color for hi-hat may be set basically to blue, and the color tone may be modified to near-dark blue when the rhythm style is jazz, and to light blue when the rhythm style is reggae. The name of the instrument may be indicated in katakana.

Figure 3E:
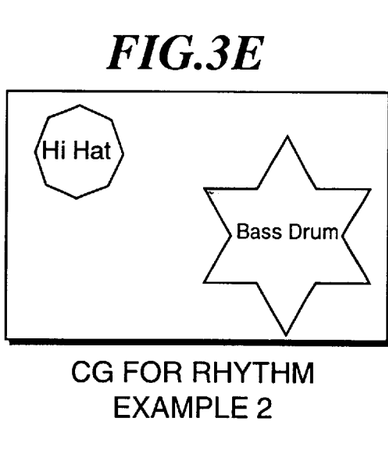
FIG. 3E is a view showing another example of CG for rhythm.

FIG. 3E shows another example of CG for rhythm. In this example, a character indicating the name of a musical instrument is displayed together with a figure such as a polygon or a circle. The display position of the name of each instrument corresponds to the instrument, and the size of the figure is determined according to the velocity of the key depression. The shape and display color of the figure are varied according to the rhythm style.

The present invention is not limited to the above described examples. Various other drawing patterns can be displayed.

Thus, according to the present invention, the musical elements of melody, harmony, and rhythm are expressed by using drawing patterns of character or geometrical figure, and by changing the size, shape, brightness, hue and chroma. Therefore, it is possible to express the musical elements visually without imposing special burden on the image processing system, and thus provide a novel interaction using sound and image.

Figure 4:
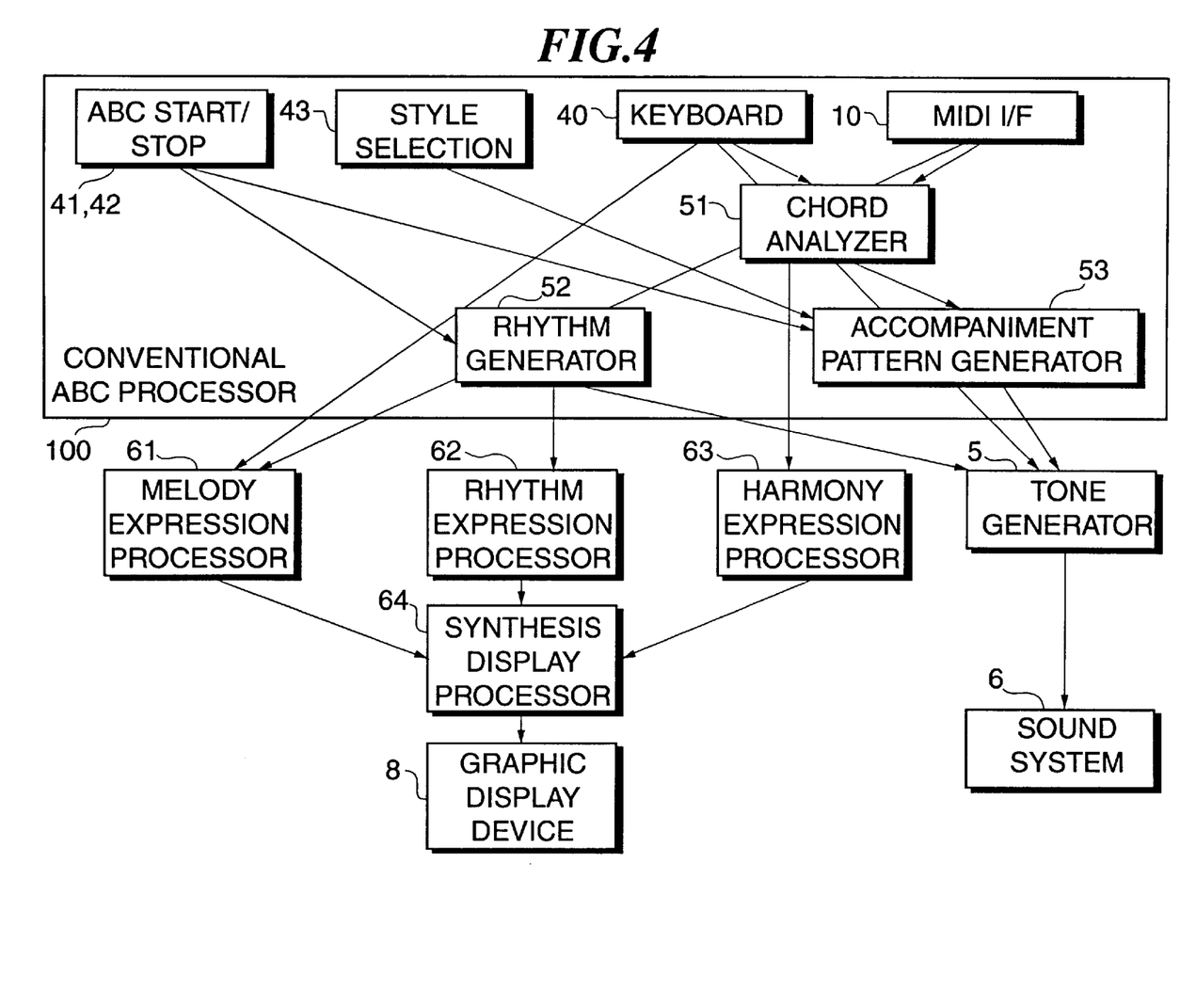
FIG. 4 is a schematic view showing an outline of processing operations executed by the musical image display apparatus.

Next, the processing operation of the present electronic musical instrument with a musical image display function will be described with reference to FIG. 4. FIG. 4 is a schematic functional block diagram showing functional blocks for performing the processing operation.

In FIG. 4, reference numeral 100 denotes an auto bass chord processor (ABC processor) which is conventionally known, and which includes a chord analyzer 51, a rhythm generator 52, and an accompaniment pattern generator 53. The activation of the rhythm generator 52 and the accompaniment pattern generator 53 is controlled by the above-mentioned automatic performance start and stop switches 41 and 42, and an accompaniment pattern to be generated by the accompaniment pattern generator 53 is selected by an automatic performance pattern selector included in the above-mentioned style selection switch 43. When a signal is input from the keyboard 40 or the MIDI interface circuit 10, the chord is discriminated by the chord analyzer 51, and the accompaniment pattern generator 53 is thereby controlled. Tone generator control parameters from the keyboard 40, rhythm generator 52, and accompaniment pattern generator 53 are input to the tone generator 5, which in turn generates corresponding musical tones to be sounded by the sound system 6.

A tone generation event from the keyboard 40 or from the MIDI interface circuit 10 is supplied to a melody expression processor 61, which in turn generates image information for displaying a drawing pattern corresponding to the melody, as described later, and outputs the same to a synthesis display processor 64. A tone generation event from the rhythm generator 52 is supplied to a rhythm expression processor 62, which in turn generates image information for displaying a drawing pattern corresponding to the rhythm. Musical event information such as chord type information from the chord analyzer 51 is supplied to a harmony expression processor 63, which in turn generates image information for displaying a drawing pattern corresponding to the harmony. These kinds of image information for displaying drawing patterns from the melody expression processor 61, rhythm expression processor 62, and harmony expression processor 63 corresponding to the respective musical elements are supplied to the synthesis display processor 64, which synthesizes the image information in accordance with the display mode selected by the above-mentioned switches 47 to 49 for selecting the display mode, and outputs the synthesized information to the graphic display device 8.

The melody expression processor 61, rhythm expression processor 62, harmony expression processor 63, and synthesis display processor 64 are realized by the image calculation device 7 appearing in FIG. 1.

Figure 5A:
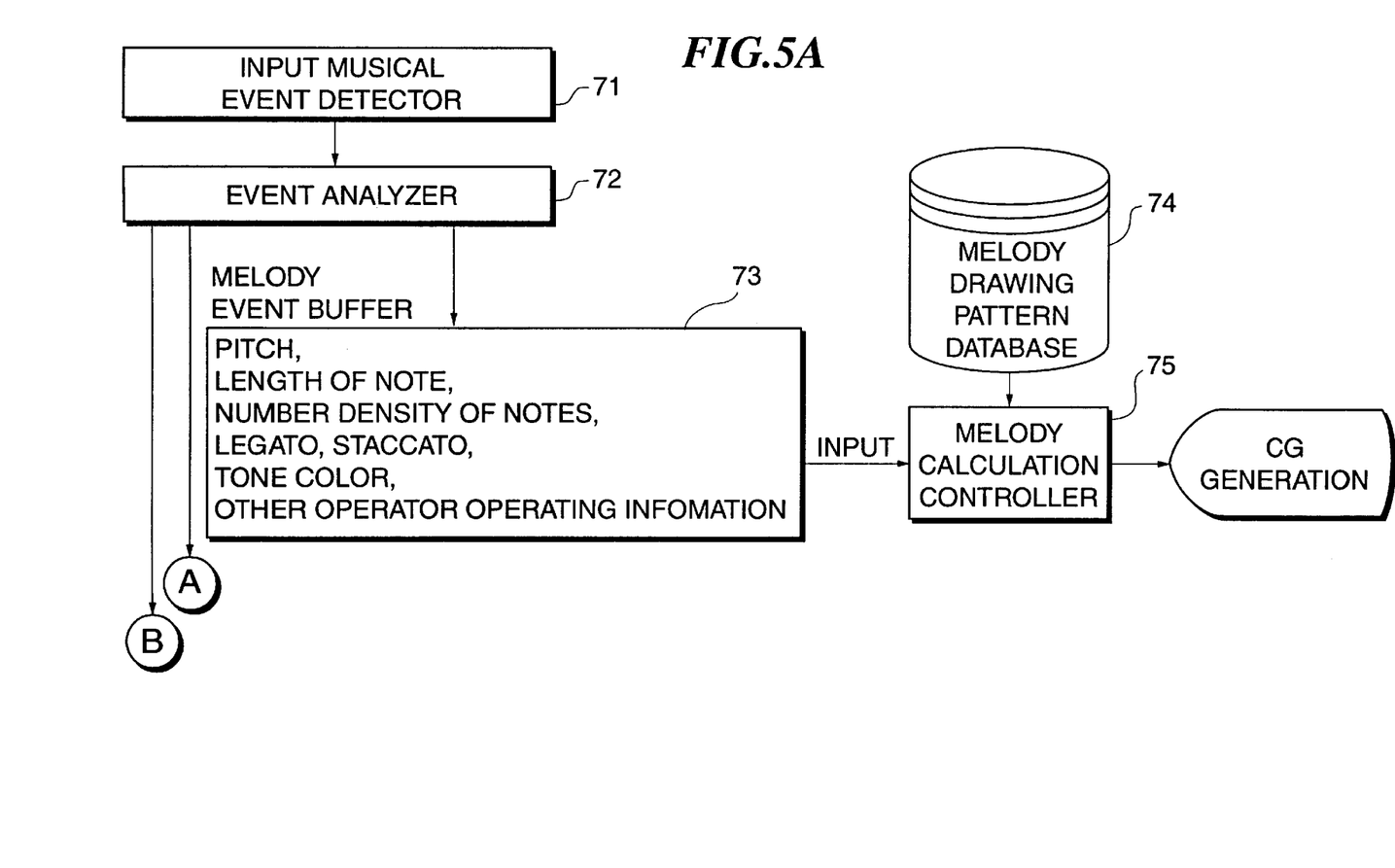
FIG. 5 is a view showing the construction of a system of a melody expression processor, a rhythm expression processor, a harmony expression processor, and a synthesis display processor.
Figure 5B:
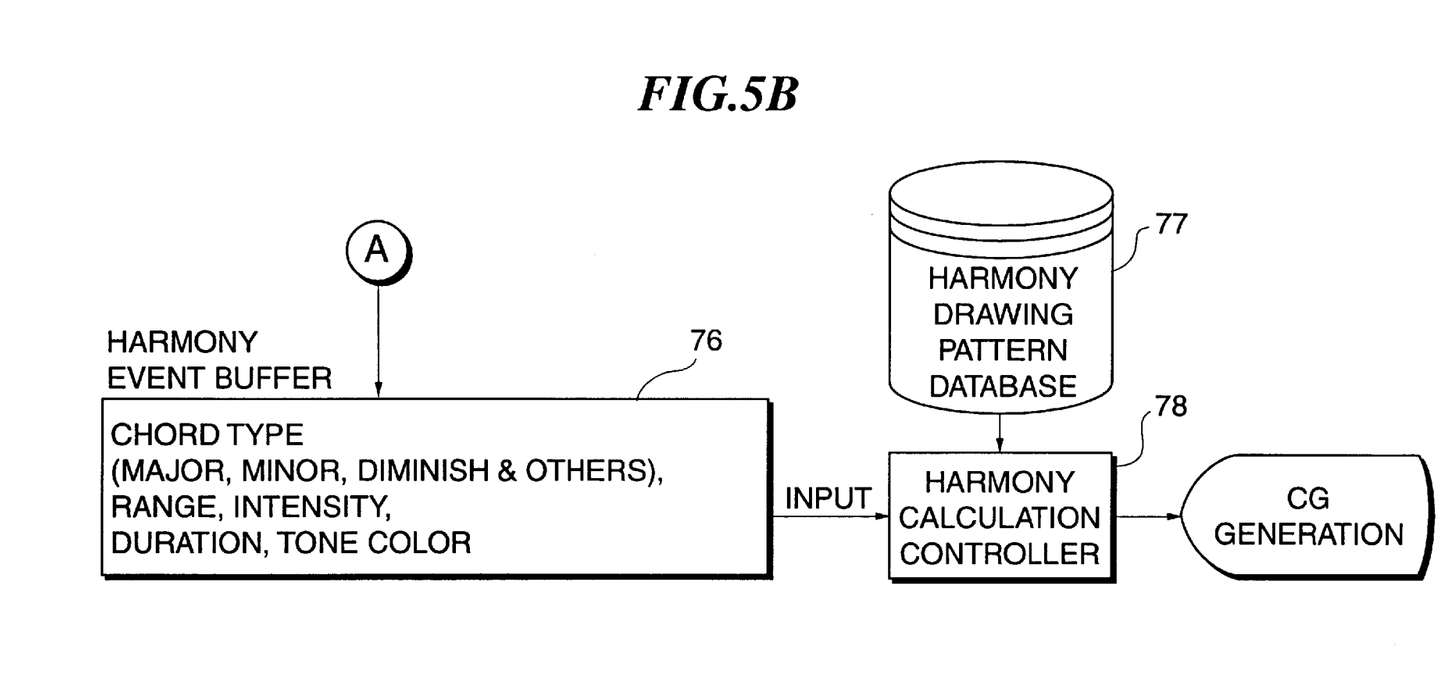
Figure 5C:
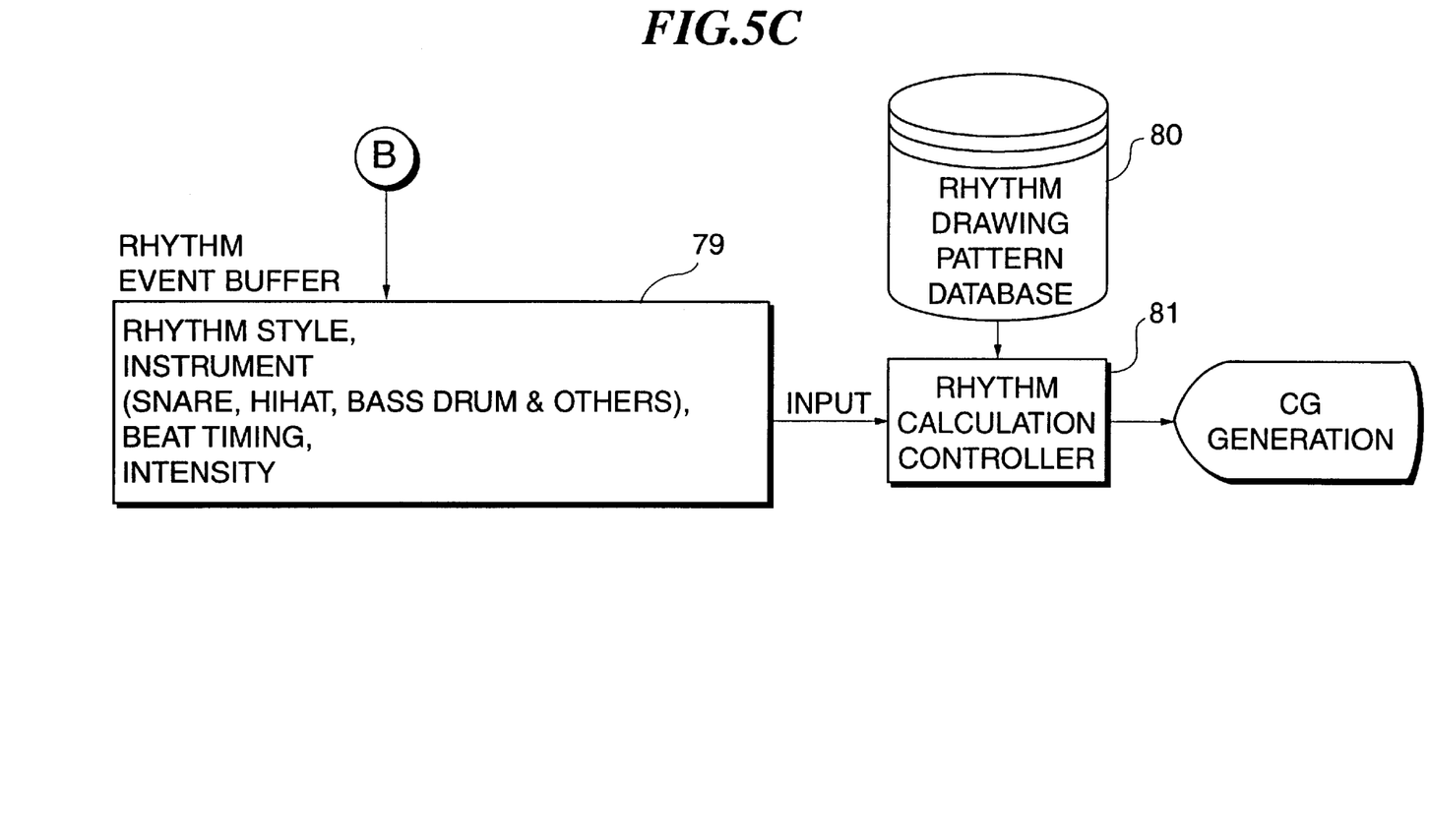

Next, the operation of the image calculation device 7 (FIG. 1) that operates as the above-mentioned melody expression processor 61, rhythm expression processor 62, harmony expression processor 63, and synthesis display processor 64 will be described with reference to FIGS. 5 and 6. FIG. 5 shows the construction of the system of the melody expression processor, rhythm expression processor, harmony expression processor, and synthesis display processor. FIGS. 6A to 6C are flow charts showing the operations of the melody expression processor, rhythm expression processor, harmony expression processor, and synthesis display processor As shown in FIG. 4 above, musical event information such as performance information from the keyboard 40, the MIDI interface circuit 10, the rhythm generator 52 and the chord analyzer 51 are input to the image calculation device 7. Each piece of the musical event information is detected by an input musical event detector 71. The detector 71 is provided with a buffer that stores pieces of musical event information which are sequentially generated, from which the pieces of musical event information are read out at time intervals of a predetermined calculation period.

The musical event information which have been read out from the buffer are classified into pieces of musical event information related to the respective elements of melody, harmony, and rhythm by an event analyzer 72, and stored in respective corresponding event buffers, that is, a melody event buffer 73, a harmony event buffer 76, and a rhythm event buffer 79, respectively.

The manner of this classification may be set such that, for example, the musical events are classified part by part, i.e. into elements of melody, harmony (backing or the like), and rhythm for each part. Alternatively, the operator may set freely the manner of classification for each part. Further, the classification may be carried out based on the tone color. Still further, for each part, the key region may be divided into a left hand region and a right hand region such that musical event information from the left hand region is determined to be backing, and musical even information from the right hand region is determined to be melody event, respectively.

Among the musical event information, information related to melody part which is input from the keyboard 40 or an external MIDI machine via the MIDI interface circuit 10, that is, information identifying pitch, length of note, note number density, legato or staccato, and information about tone color or the like are stored in the melody event buffer 73.

Information related to chord backing part or bass part from a chord detecting region of the keyboard 40, that is, information about chord type such as major, minor, or diminish, and information about range, intensity, duration, and tone color are stored in the harmony event buffer 76.

Further, information related to rhythm part, that is, information about rhythm style, kind of instrument (snare drum, hi-hat cymbal, bass drum), beat timing, and intensity is stored in the rhythm event buffer 79.

A melody calculation controller 75 generates image information indicative of a drawing pattern corresponding to the musical event information stored in the melody event buffer 73 by referring to a melody drawing pattern database 74, at time intervals of a predetermined calculation period.

Figure 6A:
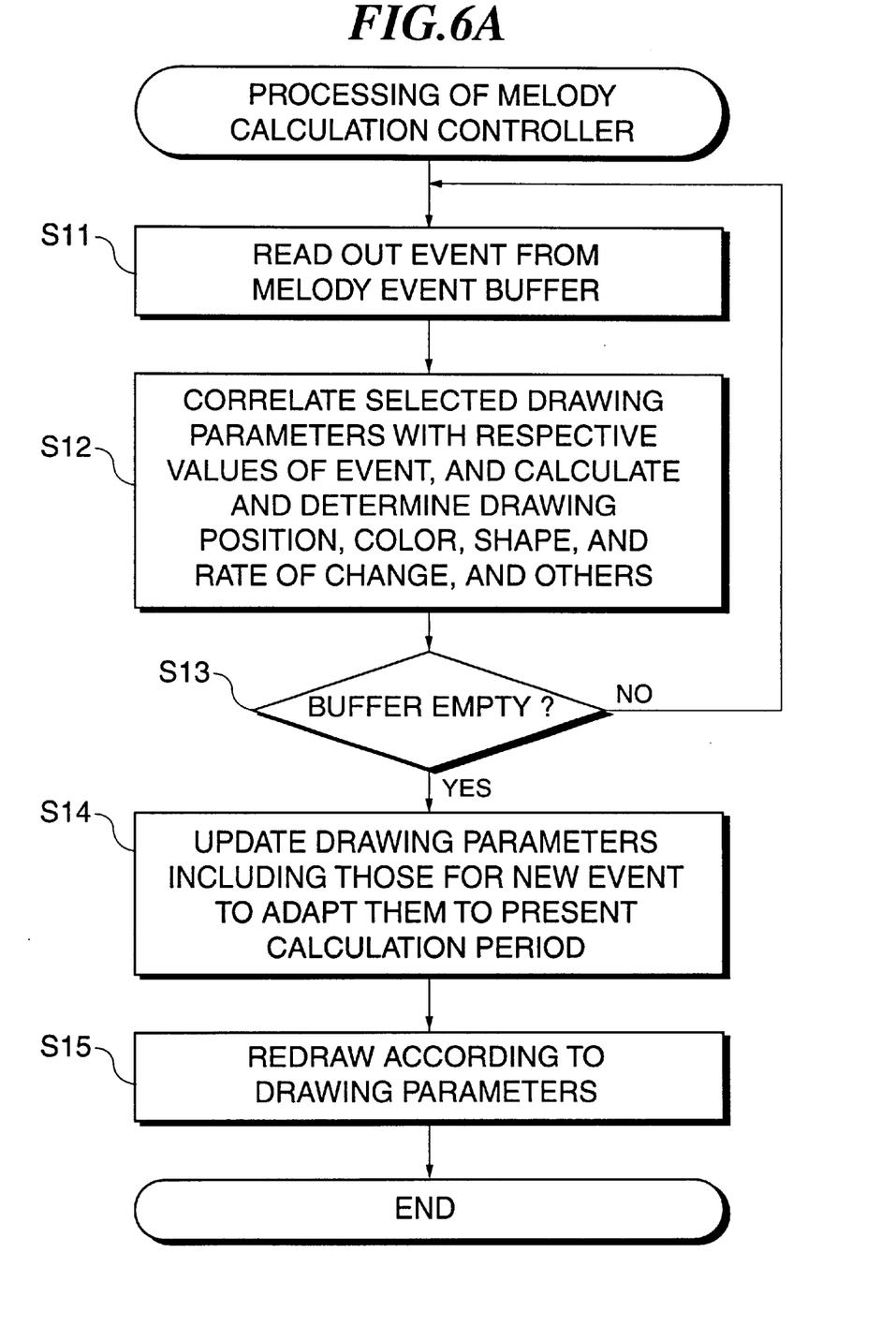
FIG. 6A is a flow chart showing the operation of a melody calculation controller.
Figure 6B:
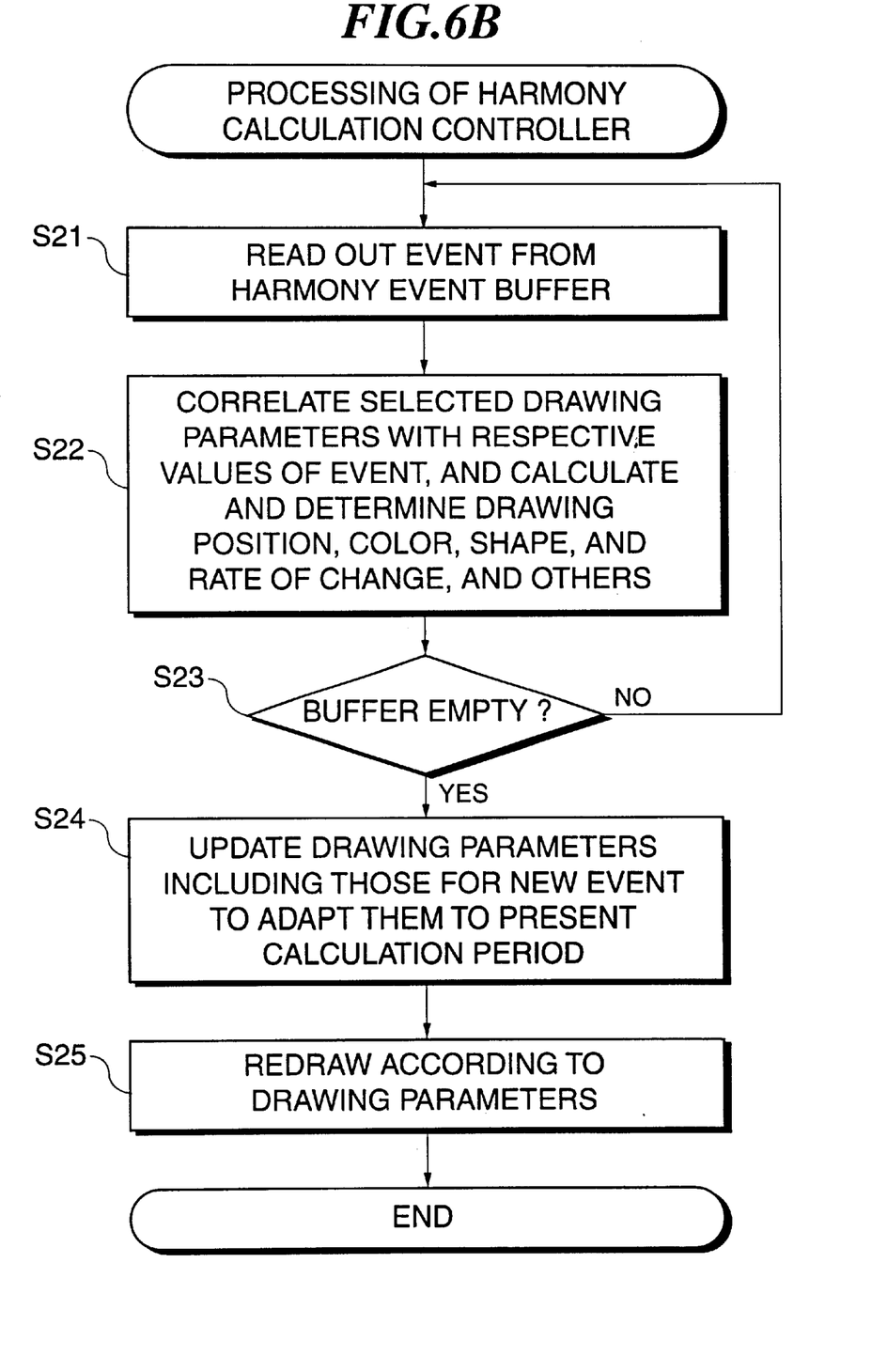
FIG. 6B is a flow chart showing the operation of a harmony calculation controller.
Figure 6C:
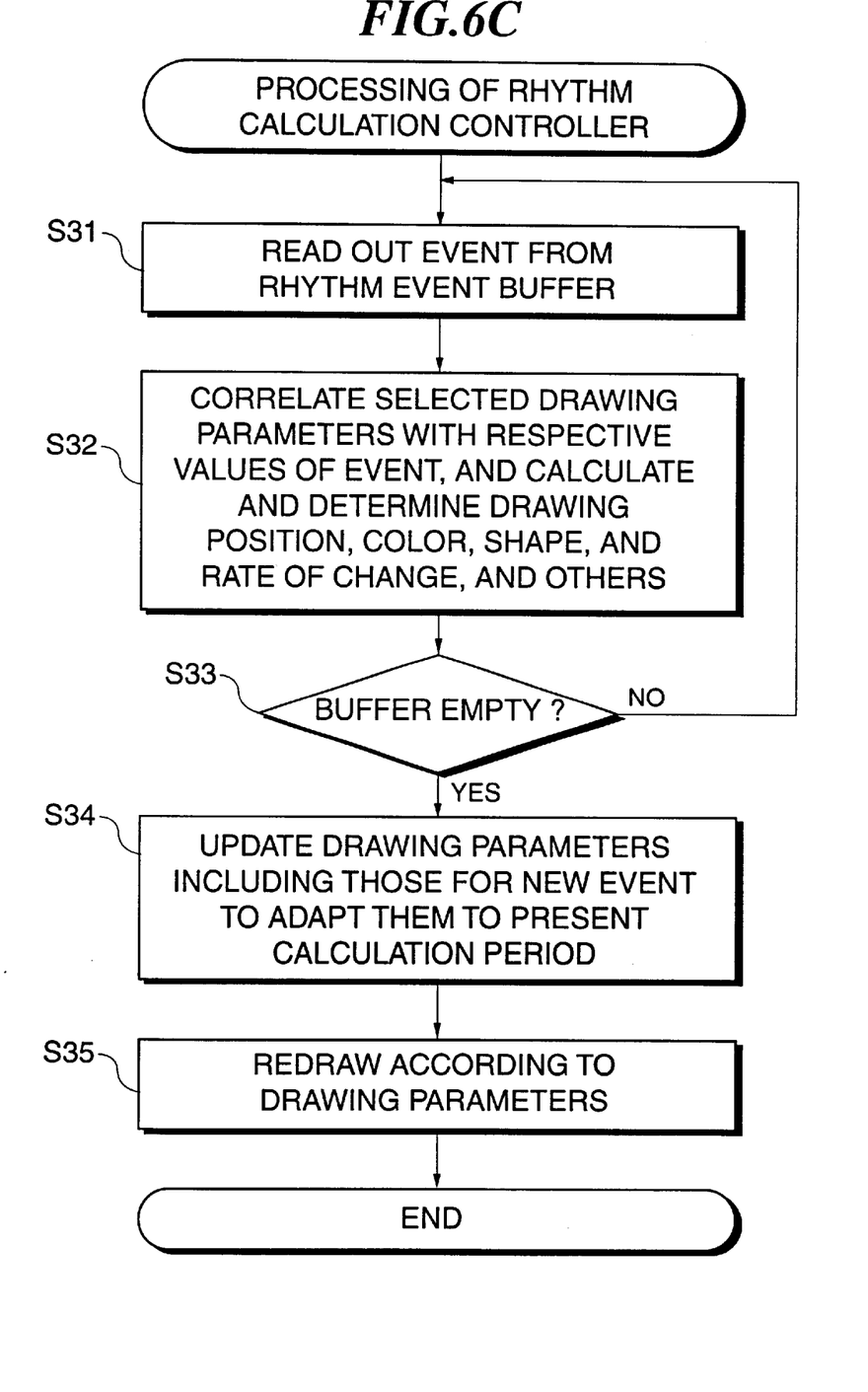
FIG. 6C is a flow chart showing the operation of a rhythm calculation controller.

FIG. 6A is a flow chart showing the operation of the melody calculation controller 75. First, at step S11, event information related to the element of melody that is stored in the melody event buffer 73 is read out. Drawing parameters corresponding to a drawing pattern corresponding to the element of melody that is selected by the style selection switch 43 (FIG. 2) is read out from the melody drawing pattern database 74, and the drawing position, color, shape, changing speed and others of the drawing pattern are calculated in accordance with the respective values of musical event information read out from the melody event buffer 73 (step S12). This processing is repeated for all the pieces of musical event information related to the element of melody for the present calculation period that are stored in the melody event buffer 73 (step S13). Next, at step S14, the drawing parameters of the new event generated in the present loop at the step S12, and drawing parameters that had been generated in the previous loops or the previous calculation periods are updated to adapt the parameters to the present calculation period, and redrawing processing is performed in accordance with each of the drawing parameters (step S15).

In the same manner as above, a harmony calculation controller 78 generates image information indicative of a drawing pattern corresponding to musical event information stored in the harmony event buffer 76 by referring to a harmony drawing pattern database 77. FIG. 6B is a flow chart showing the operation of the harmony calculation controller 78. The processing is basically identical with that of the melody calculation controller 75 as shown in FIG. 6A above.

Also in the same manner, a rhythm calculation controller 81 generates image information indicative of a drawing pattern corresponding to musical event information stored in the rhythm event buffer 79 by referring to a rhythm drawing pattern database 80. FIG. 6C is a flow chart showing flow of the processing of the rhythm calculation controller 81. The processing is basically identical with those shown in FIGS. 6A and 6B above.

Thus, the calculation controllers 75, 78 and 81 refer to the respective corresponding drawing pattern databases 74, 77 and 80, to read out drawing patterns that are selected by the style selection switch 43, and modify them according to the respective musical events, to thereby draw respective corresponding visual expressions.

Although in the above described embodiment, the present invention is applied to an electronic musical instrument having a keyboard, the invention may also be applied to other electronic musical instruments such as a drum machine or a sequencer, as well as to a general purpose personal computer, as mentioned previously.

Figure 7:
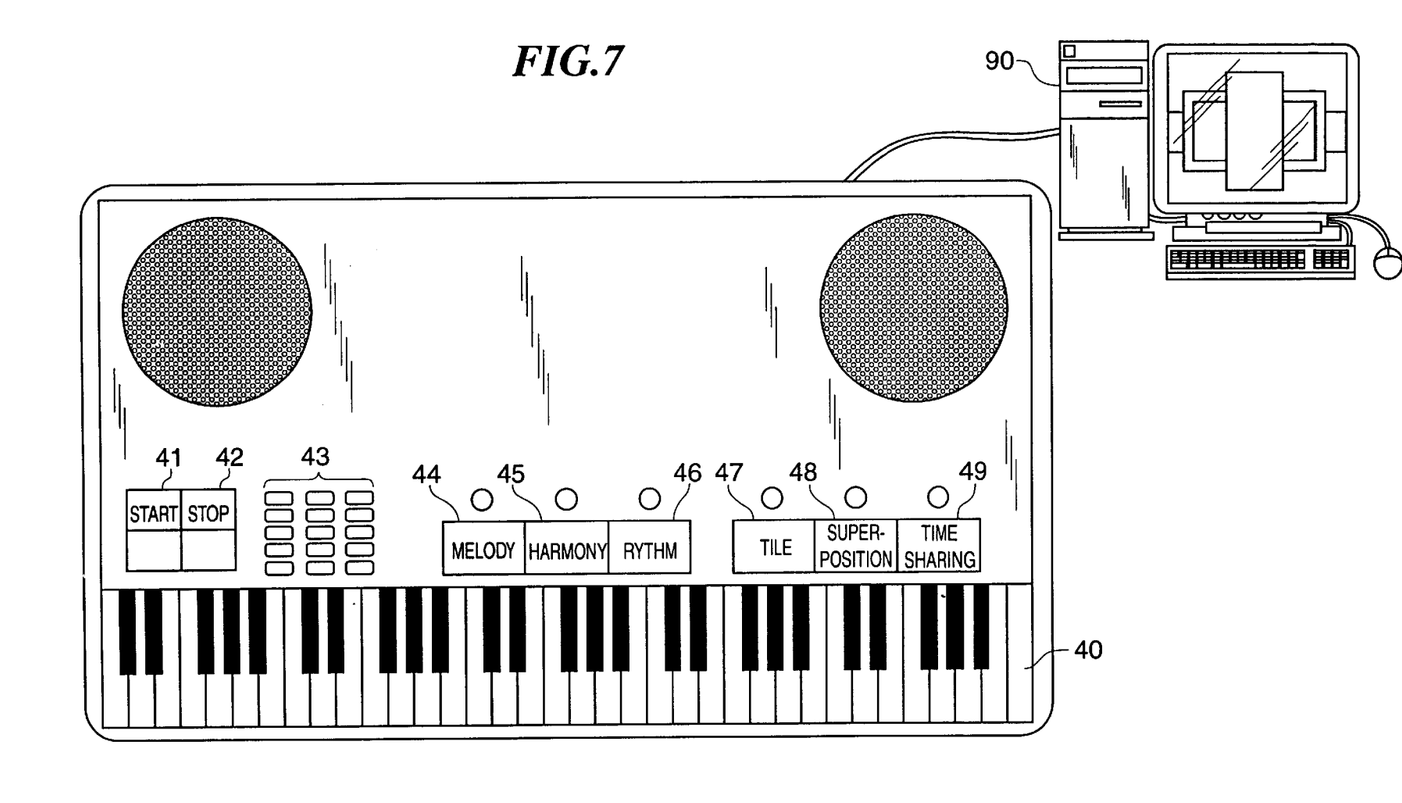
FIG. 7 is a view showing the appearance of a musical image display apparatus according to an embodiment of the present invention, which is applied to a personal computer.

FIG. 7 shows another embodiment of the present invention in which the apparatus of the present invention is applied to a personal computer 90. In this embodiment, an electronic musical instrument having an ordinary auto-base chord function is connected to a MIDI communication interface circuit of the personal computer 90 such that the personal computer 90 may be caused to execute the functions of the image calculation device 7 and the graphic display device 8 in the construction shown in the FIG. 1 above, and the drawing pattern databases 74, 77, and 80, and others.

Thus, the musical image display apparatus according to the present invention can be implemented by an electronic musical instrument having an existing auto-base chord function or an automatic performance apparatus, by connecting the apparatus according to the present invention via the MIDI interface circuit to the electronic musical instrument or automatic performance apparatus.

The present invention may be accomplished by supplying a program to the system or the apparatus. In this case, the effects of the present invention can be achieved by storing a program represented by a software for achieving the present invention in a storage medium and reading the program into the system or the apparatus.

The storage medium for storing the program may be a floppy disk, a hard disk, an optical disk, a magneto-optical disk, a CD-ROM, a CD-R, a DVD, a magnetic tape, a non-volatile memory card, and others.

The functions of the above described embodiments may be realized by the following process. A program code read from the storage medium is written into a memory provided in a capability expansion board or a capability expansion unit connected to the computer, and a CPU or the like provided in the capability expansion board or the capability expansion unit executes a part or the whole of the actual operations according to instructions of the program code to realize the functions of the above described embodiments.

In this case, the program code itself read from the storage medium accomplishes the novel functions of the present invention, and thus the storage medium storing the program code constitutes the present invention.

The functions of the illustrated embodiments may be accomplished not only by executing the program code read by a computer, but also by causing an operating system (OS) on the computer, to perform a part or the whole of the actual operations according to instructions of the program code.

Further, the program for performing the musical image display control according to the present invention may be supplied from an external storage medium via a network such as electronic mail or personal computer communication.

As described above, according to the present invention, it is possible to enjoy the display of high quality images corresponding to sounds as a background screen of a live concert or the like, with ease and without requiring any special machine. Thus, in contrast to the conventional electronic musical instrument which produces only sounds, a novel interaction using sound and image can be realized.

Further, visual expressions of the musical elements of melody, harmony, and rhythm can be displayed singly or in combination, so that for example, all the three elements may be displayed in playing back popular music in general, only the element of melody may be displayed in playing back classical music, and only the element of rhythm may be displayed in playing back dance music or in using the apparatus as a metronome.

Further, since each of the musical elements of melody, harmony, and rhythm has a plurality of drawing patterns, a wide variety of visual expressions can be realized by combining these patterns.

Since no complicated processing such as rendering is performed, the present apparatus does not occupy much of the capability of the CPU, and high quality of drawing can be achieved independently of the resolution of the display device.

What is claimed is:

1. A musical image display apparatus comprising:

an analyzer that classifies performance information into performance information related to a plurality of musical elements, and outputs the classified performance information;

a drawing pattern storage device that stores drawing patterns for each of the musical elements;

an image calculation device that reads out at least one drawing pattern from said drawing patterns storage device, and modifies the read out drawing pattern according to corresponding classified performance information from said analyzer to thereby generate image information corresponding to at least corresponding one of said musical elements; and an image display that displays the image information corresponding to the at least corresponding one of said musical elements generated by said image calculation device.

2. A musical image display apparatus as claimed in claim 1, further comprising a display mode selecting device that selects a mode of display of the image information selected to be displayed on said image display device.

3. A musical image display apparatus as claimed in claim 1, wherein said drawing patterns comprise at least one of geometrical patterns and characters, said image calculation device performing processing for modifying attributes of the read out drawing pattern that include at least one of size, shape, brightness, hue, and chroma, according to the corresponding classified performance information.

4. A musical image display apparatus as claimed in claim 1, further comprising a communication interface circuit that communicates with an external machine, for enabling performance information input from the external machine via said communication interface circuit to be input to said analyzer.

5. A musical image display apparatus as claimed in claim 1, further comprising an output device that outputs the image information corresponding to the at least corresponding one of said musical elements output from said image calculation device to an external machine.

6. A musical image display apparatus as claimed in claim 1, wherein said plurality of musical elements include at least melody, harmony and rhythm.

7. A musical image display apparatus as claimed in claim 1, wherein said performance information comprises pieces of musical event information which are sequentially generated.

8. A musical image display apparatus as claimed in claim 1, further comprising a selector that selects image information to be displayed by said image display, as desired.

9. A musical image display method comprising:

an analyzing step of classifying performance information into performance information related to a plurality of musical elements, and outputting the classified performance information;

a drawing pattern storage step of storing drawing patterns for each of said musical elements;

an image calculation step of reading out at least one drawing pattern stored by said drawing pattern storage step, and modifying the read out drawing pattern according to corresponding classified performance information output said analyzing step to thereby generate image information corresponding to at least corresponding one of said musical elements; and an image display step of displaying the image information corresponding to the at least corresponding one of said musical elements generated by said image calculation step.

10. A musical image display method as claimed in claim 9, wherein said plurality of musical elements include at least melody, harmony and rhythm.

11. A musical image display method as claimed in claim 9, further comprising a selection step of selecting image information to be displayed by said image display step, as desired.

12. A machine readable storage medium containing instructions for causing said machine to perform a musical image display method comprising:

an analyzing step of classifying performance information into performance information related to a plurality of musical elements, and outputting the classified performance information;

a drawing pattern storage step of storing drawing patterns for each of said musical elements;

an image calculation step of reading out at least one drawing pattern stored by said drawing pattern storage step, and modifying the read out drawing pattern according to corresponding classified performance information output said analyzing step to thereby generate image information corresponding to at least corresponding one of said musical elements; and an image display step of displaying the image information corresponding to the at least corresponding one of said musical elements generated by said image calculation.

13. A machine readable storage medium as claimed in claim 12, wherein said plurality of musical elements include at least melody, harmony and rhythm.

14. A machine readable storage medium as claimed in claim 12, wherein said musical image display method further comprises a selection step of selecting image information to be displayed by said image display step, as desired.

* * * * *